United States Patent
Bohling et al.

(10) Patent No.: US 8,381,185 B2
(45) Date of Patent: Feb. 19, 2013

(54) APPARATUS, SYSTEM, AND METHOD FOR DYNAMIC MODULE FLOW ANALYSIS

(75) Inventors: Neil Everett Bohling, Tucson, AZ (US);
Douglas Lee Lehr, Tucson, AZ (US);
David Charles Reed, Tucson, AZ (US);
Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 995 days.

(21) Appl. No.: 12/415,713

(22) Filed: Mar. 31, 2009

(65) Prior Publication Data
US 2010/0251214 A1   Sep. 30, 2010

(51) Int. Cl.
*G06F 9/44* (2006.01)
*G06F 9/45* (2006.01)

(52) U.S. Cl. .......... 717/124; 717/132; 717/144

(58) Field of Classification Search .......... 717/124–128, 717/141–144, 154–157, 131–133
See application file for complete search history.

(56) References Cited

U.S. PATENT DOCUMENTS

| | | | | |
|---|---|---|---|---|
| 5,613,117 A * | 3/1997 | Davidson et al. | 717/144 |
| 5,836,014 A * | 11/1998 | Faiman, Jr. | 717/156 |
| 6,014,513 A * | 1/2000 | Voelker et al. | 717/131 |
| 6,070,009 A | 5/2000 | Dean et al. | |
| 6,202,199 B1 * | 3/2001 | Wygodny et al. | 717/125 |
| 6,487,715 B1 * | 11/2002 | Chamdani et al. | 717/154 |
| 6,820,256 B2 * | 11/2004 | Fleehart et al. | 717/155 |
| 6,907,599 B1 * | 6/2005 | Kashai et al. | 717/137 |
| 7,032,212 B2 * | 4/2006 | Amir et al. | 717/124 |
| 7,058,928 B2 * | 6/2006 | Wygodny et al. | 717/128 |
| 7,089,537 B2 * | 8/2006 | Das et al. | 717/132 |
| 7,287,243 B2 * | 10/2007 | Dollin et al. | 717/126 |
| 7,398,514 B2 * | 7/2008 | Ulrich et al. | 717/124 |
| 7,627,857 B2 * | 12/2009 | Rokosz | 717/124 |
| 7,779,390 B1 * | 8/2010 | Allavarpu et al. | 717/124 |
| 7,797,687 B2 * | 9/2010 | Tillmann et al. | 717/131 |
| 7,840,947 B2 * | 11/2010 | Lev et al. | 717/124 |
| 7,886,272 B1 * | 2/2011 | Episkopos et al. | 717/124 |
| 7,945,898 B1 * | 5/2011 | Episkopos et al. | 717/124 |
| 8,079,020 B2 * | 12/2011 | Chilimbi et al. | 717/132 |
| 8,214,807 B2 * | 7/2012 | Bestgen et al. | 717/128 |
| 2005/0223357 A1 | 10/2005 | Banerjee et al. | |
| 2006/0242636 A1 | 10/2006 | Chilimbi et al. | |
| 2007/0226706 A1 | 9/2007 | Wells | |

OTHER PUBLICATIONS

Traeger et al, "DARC: Dynamic analysis of root causes of latency distribution", ACM SIGMETRICS, pp. 277-288, 2008.*
Chipounov et al,"S2E: A platform for in vivo multi path analysis of software systems", ACM ASPLOS, pp. 265-278, 2011.*
Sridharan et al, "Refinement based context sensitive points to anlaysis for Java", ACM PLDI, pp. 387-400.*

(Continued)

*Primary Examiner* — Anil Khatri
(74) *Attorney, Agent, or Firm* — Kunzler Law Group, PC (57) ABSTRACT

An apparatus, system, and method are disclosed for analyzing code paths. In one embodiment, a starting point for one or more code paths within a listing of code is specified. The starting point may include code from which one or more code paths flow. An ending point is also specified for one or more code paths within the code, wherein the ending point includes code that is reachable via one or more of the code paths flowing from the starting point. Each code path flowing from the starting point to the ending point is determined by analyzing the listing of code without execution of the code. Information about the determined code paths is provided to a user.

19 Claims, 6 Drawing Sheets

OTHER PUBLICATIONS

Bright et al, "Critical performance path analysis and efficient code generation issues for the seamless architecture", IEEE, pp. 590-596, 1993.*

Puschner et al., Computing Maximum Task Execution Times—A Graph-BasedApproach, Real-Time Systems, vol. 13 , Issue 1, Jul. 1997, pp. 67-91.

* cited by examiner

APPARATUS, SYSTEM, AND METHOD FOR DYNAMIC MODULE FLOW ANALYSIS

FIELD

This invention relates to testing and analyzing code paths and more particularly relates to ensuring code path coverage and code execution paths for testing and analyzing code.

BACKGROUND

Description of the Related Art

In today's computer environment, maintenance costs are often more expensive than initial develop costs. Part of the reason for this is the complexity of testing and analyzing code paths as products and programs grow over time. Products sometimes become so large and complex, that it takes a vast amount of man hours to analyze various code paths to try to determine how the code got from one point in the code to another point in the code. It is equally difficult when testing products to ensure code path coverage or to force a particular code path for execution.

Known technology in this area includes debuggers, which step through the code as it is executed. In some cases debuggers may utilize simulators such as an instruction set simulator ("ISS") which provide the ability to halt execution of the code in response to the occurrence of particular events. Debuggers are typically useful in identifying the position in the code where a failure of the program occurs. Debuggers may also incorporate additional operations for executing a program such as single-stepping and stopping the program at various points in the code. The problem with current debuggers is the inability to ensure code path coverage of all paths between two points of code. For example, a user may be unable to determine which code path led to a crash of the program, and attempts to execute every possible code path may be too cumbersome or complex. Further, debuggers require that the code be executed as the debugger operates. This causes additional limitations on the usefulness of conventional debuggers.

Some debugging tools provide the ability to handle cross-referencing of variables and module calls. However, such tools are typically only able to handle one level of cross referencing, and thus are limited in their ability ensure code path coverage. As products become large and complex, such tools fail to provide adequate information and provide insufficient analysis of various potential code paths to handle large and complex products.

Furthermore, the conventional art lacks the ability to specify a starting point and an ending point in the code for analyzation, and lacks the ability to determine each code path between the two identified points. Additionally, the prior art lacks the ability to accept some known variables such that each potential code path based on both known and unknown variables can be determined. These unsolved problems in the art are resolved by the present invention.

BRIEF SUMMARY

From the foregoing discussion, it should be apparent that a need exists for an apparatus, system, and method that provide information about and analysis of code paths within large and complex products. Beneficially, such an apparatus, system, and method would accept a starting point and an ending point, accept any known variable values, and from that build a dynamic chart that can plot in various forms the potential code paths that could be taken from the starting point to the ending point in the code. The invention would be able to analyze code listings and create dynamic maps that outline the code flow without execution of the code.

The present invention has been developed in response to the present state of the art, and in particular, in response to the problems and needs in the art that have not yet been fully solved by currently available code analysis tools. Accordingly, the present invention has been developed to provide an apparatus, system, and method for analyzing code that overcome many or all of the above-discussed shortcomings in the art.

The apparatus to analyze code paths is provided with a plurality of modules configured to functionally execute the necessary steps of the present invention. These modules in the described embodiments include a start module, an end module, a code path analyzer module, and a results module.

The start module specifies a starting point for one or more code paths within a listing of code. The starting point includes code from which one or more code paths flow. The end module specifies an ending point for one or more code paths within the code. The ending point includes code that is reachable via one or more of the code paths flowing from the starting point.

The code path analyzer module determines each code path flowing from the starting point to the ending point The code path analyzer module does this by analyzing the listing of code without execution of the code. The results module provides information about the determined code paths to a user.

In one embodiment, the code path analyzer module receives one or more known variables. Then, the code path analyzer module determines each path from the starting point to the ending point that is reachable given the one or more known variables. In a further embodiment, one or more variables are unknown, and the code path analyzer module determines each code path from the starting point to the ending point that is reachable based on potential values of the one or more unknown variable values and based on the one or more known variable values. In yet a further embodiment, the results module identifies potential values for each unknown variable value corresponding to a particular code path such that execution of the code based on the identified values would result in execution of the particular corresponding code path. The results module may also present the identified potential values to the user.

The apparatus, in one embodiment, further comprises a map module that generates a decision map by scanning the listing of code for decision statements, each decision statement comprising code from which two or more code paths diverge. The code path analyzer module utilizes the decision map to determine each code path between the starting point and ending point. In one embodiment, the code path analyzer module traverses the decision map beginning the specified starting point in a breadth first traversal until each code path between the starting point and the ending point is determined. In another embodiment, the code path analyzer module traverses the decision map beginning with the specified ending point and working backwards in a breadth-first traversal until each code path between the starting point and ending point is determined.

The apparatus is further configured, in one embodiment, such that the code path analyzer module accesses a pre-generated decision map to determine each code path between the starting point and ending point, the decision map comprising a representation of decision statements, each decision statement comprising code from which two or more code paths diverge.

In various embodiments, the results module may present information and details about the code paths various different ways including graphical and textual representations.

A system of the present invention is also presented to analyze code paths. The system in the disclosed embodiments substantially includes the steps necessary to carry out the functions presented above with respect to the operation of the described apparatus and method. In particular, the system, in one embodiment, includes a computer system comprising a processor configured to execute program code and a memory having stored there on a listing of code for analyzation. The system also includes the modules described above with regard to the apparatus including a start module, an end module, a code path analyzer module, and a results module.

A method of the present invention is also presented for analyzing code paths. The method in the disclosed embodiments substantially includes the steps necessary to carry out the functions presented above with respect to the operation of the described apparatus and system. In one embodiment, the method includes specifying a starting point for one or more code paths within a listing of code. The starting point may include code from which one or more code paths flow. The method also may include specifying an ending point for one or more code paths within the code, wherein the ending point includes code that is reachable via one or more of the code paths flowing from the starting point.

In a further embodiment, the method includes determining each code path flowing from the starting point to the ending point by analyzing the listing of code without execution of the code and providing information about the determined code paths to a user.

In some embodiments, the method includes receiving one or more known variables, and determining each code path flowing from the starting point to the ending point comprises determining each code path from the starting point to the ending point that is reachable given the one or more known variables. In further embodiments, one or more variables are unknown, and determining each code path flowing from the starting point to the ending point comprises determining each path from the starting point to the ending point based on the one or more unknown variables and given the one or more known variables.

In one embodiment, providing information about the determined code paths to a user comprises identifying potential values for each unknown variable value corresponding to a particular code path such that execution of the code based on the identified values would result in execution of the particular corresponding code path and presenting the identified potential values to the user.

In one embodiment, the method includes generating a decision map by scanning the listing of code for decision statements, each decision statement comprising code from which two or more code paths diverge. The decision map is utilized to determine each code path between the starting point and ending point. In a further embodiment, the method includes traversing the decision map beginning with the specified starting point and traversing the decision map in a breadth first traversal until each code path between the starting point and the ending point is determined.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable storage medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
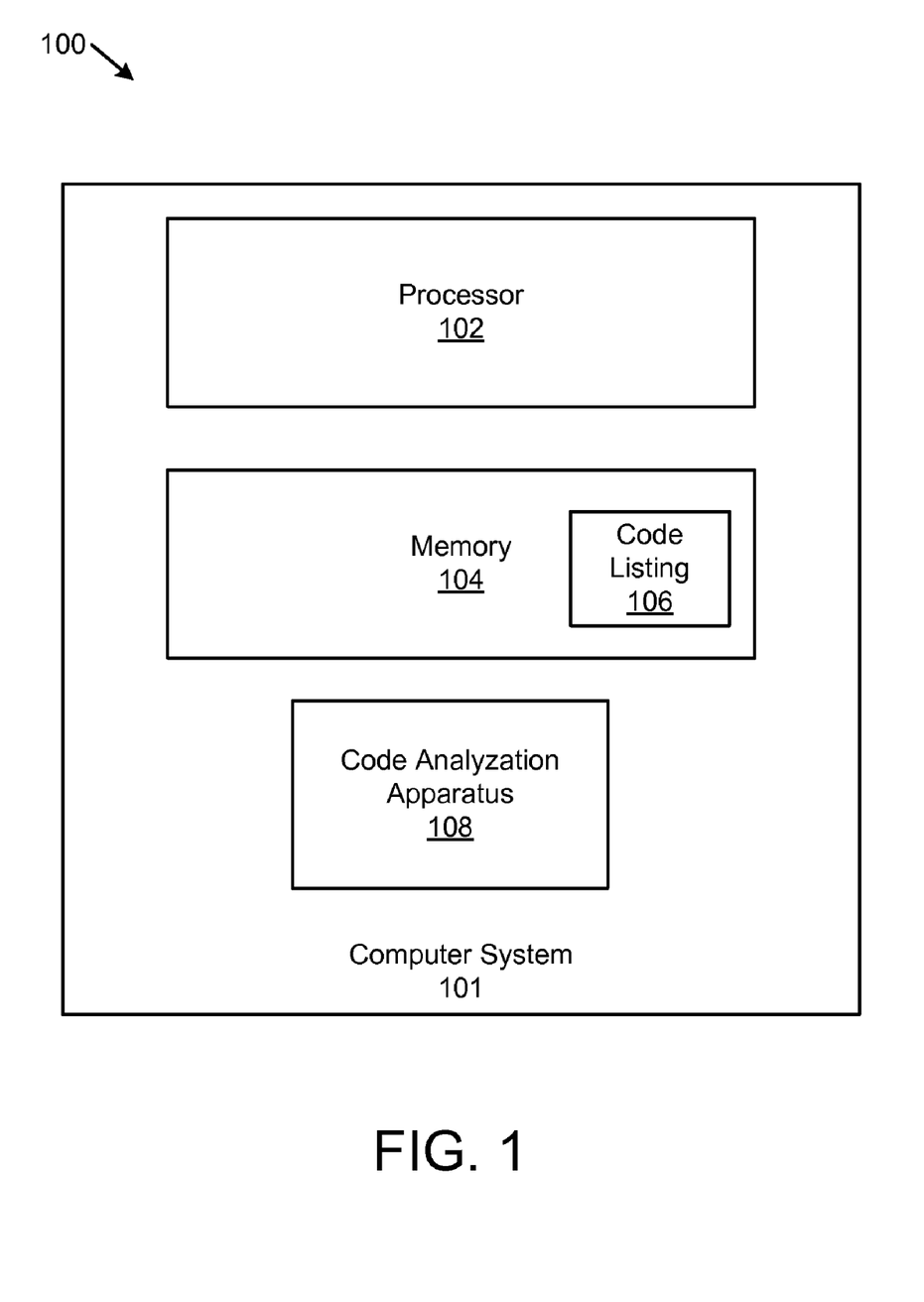
FIG. 1 is a schematic block diagram illustrating one embodiment of a system for analyzing code paths in accordance with the present invention.

FIG. 1 is a schematic block diagram illustrating one embodiment of a system 100 for analyzing code paths in accordance with the present invention. The system 100 as depicted includes a computer system 101 that includes a processor 102, a memory 104 that includes a code listing 106, and a code analyzation apparatus.

The computer system 101 preferably includes various hardware and software components needed to process instructions and commands for analyzing listings of code 106. As will be recognized by those of skill in the art, a computer system 101 may be embodied in different forms including forms such as a personal computer, a laptop, a personal digital assistant ("PDA"), a cell phone, a server, a client, etc. In at least one embodiment, the computer system 101 is a mainframe computer that is running an operating system such as z/OS from International Business Machines ("IBM") of White Plains, N.Y. In some embodiments, the computer system 101 may further include networks, network devices, and remote components that are accessible through network connections.

The computer system 101 includes at least one processor 102 or central processing unit ("CPU") for processing and executing computer programs. The processor 102 is a hardware component and is typically configured to receive and process instructions from computer programs or other hardware components. Those of skill in the art will recognize that proprietary processors are readily available from companies such as Intel or AMD.

The computer system 101 also includes at least one memory 104. A memory 104 as used herein is a hardware device that is configured to store data in either a volatile or non-volatile manner. Examples of a memory 104 may include random access memory ("RAM"), read-only memory ("ROM"), flash memory, hard disks, floppy disks, magnetic tape, optical discs, etc. In various embodiments, the memory 104 may be local or remote and may be accessed through the components of the computer system 101.

The memory 104 includes at least one code listing 106 which is a listing of program code or a listing of a portion of program code that may be analyzed in accordance with the present invention. The code listing 106 is preferably accessible by the code analyzation apparatus 108. The code listing 106 may be stored in various formats and code languages as will be recognized by those of skill in the art. Preferably, the code listing 106 is in a form compatible with the code analyzation apparatus 108 such that the code analyzation apparatus 108 is able to access, read, and process the code listing 106.

The code analyzation apparatus 108 includes the hardware and logic necessary to analyze the code listing 106 to determine potential code paths from a specified starting point to a specified ending point. As will be recognized by those of skill in the art, it is possible that a plurality of code paths exist between two points within a code listing, particularly when the code listing is very large and complex. Conventional debuggers and other technologies have been introduced that attempt to analyze code paths within a defined program, but such tools have been unable to accurately ensure code path coverage or to force a particular code path for execution. These tools also typically require execution of the code for analyzation and do not allow for the specification of a starting point and ending point for analysis. Furthermore, conventional tools are limited to only one level of cross referencing of variables and module calls, and are unable to efficiently determine each potential code path between two defined points. The problems are resolved by the system 101 and code analyzation apparatus 108 as described herein.

In accordance with the present invention, the code analyzation apparatus 108 accepts a starting and/or ending module or point and analyzes the code listing 106 without execution of the code to determine each potential code path between the two specified points. By determining each potential code path between two specified points in the code listing 106, a user may be better able to diagnose or resolve problems with the code or to expand the code to include new programs and functionality. For example, if a computer program crashes, a user may identify the point at which the program crashed. The user may then be interested in identifying the various paths that possibly lead to the failure point from a known starting point. The identification of such potential code paths enables for much more efficient code analyzation and troubleshooting.

In one embodiment, the code analyzation apparatus 108 may accept known variables such that the code analyzation apparatus 108 determines each code path that is reachable between the two specified points given the known variables. For example, suppose the code branches into two paths based on whether a variable value is true or false. If a user is interested only in paths resulting when the variable equals true, then the code analyzation apparatus 108 will find only those paths resulting from the branch in the code where the known variable equals true. This may be useful, for example, where the user knows that a program fault occurred after a known variable value was utilized.

Figure 2:
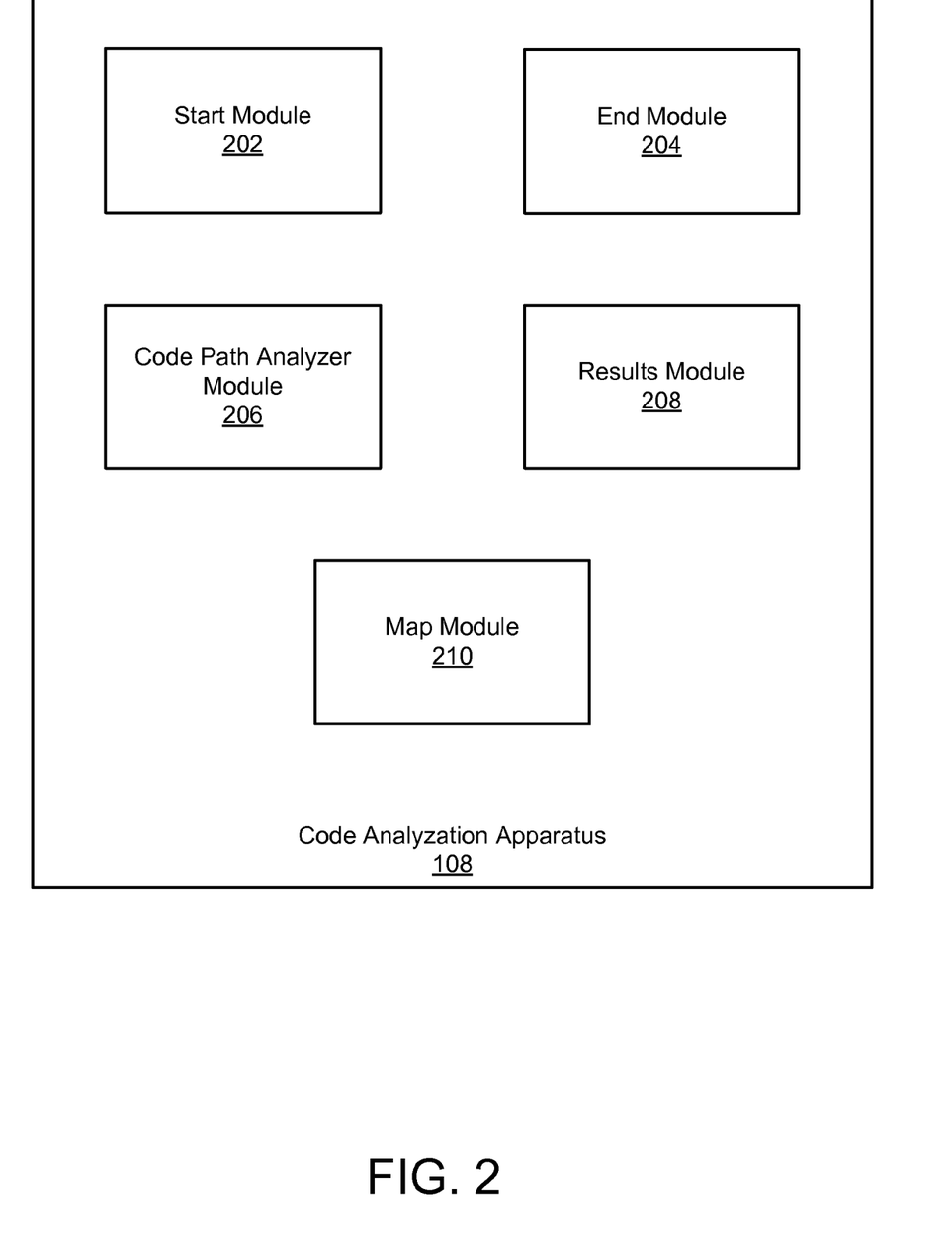
FIG. 2 is a schematic block diagram illustrating one embodiment of an apparatus for analyzing code paths in accordance with the present invention.

FIG. 2 is a schematic block diagram illustrating one embodiment of the code analyzation apparatus 108 in accordance with the present invention. In the depicted embodiment, the code analyzation apparatus 108 includes a start module, an end module, a code path analyzer module 206, and a results module 208. In some embodiments, the code analyzation apparatus 108 may also include a map module.

In accordance with the present invention, the start module 202 specifies or accepts a starting point for one or more code paths within a listing of code 106. The starting point typically includes code from which one or more code paths flow. For example, the starting point may be a module, instruction, or other point in the code that lead to additional instructions, modules, or code path branches. In some embodiments, the starting point may be the starting point of a program, subprogram, or function. In other embodiments, the starting point may be the beginning of a section of code from the code listing 106 where a problem or error is known to have occurred.

The starting point may be specified by a user in some embodiments. For example, the start module 202 may accept as input from a user a starting point or starting module at which analysis is to begin. In other embodiments, the starting point may be defined by a program or may be defined as some default value. It is also contemplated that the start module 202 may be configured to autonomically determine a starting point based a feedback results from a program or device. For example, the start module 202 may receive information that a program failed or crashed within a particular portion of code. In response to that information the start module 202 may determine a starting point at which to begin analysis of the code listing.

The end module 204 operates similarly to the start module 202 just described except that the end module 204 operates with regard to an ending point instead of a starting point. The end module 204 specifies or accepts an ending point for one or more code paths within the code and typically includes code such as a module or instruction that is preferably reachable via one or more of the code paths flowing from the starting point. Like the starting point, the ending point may be specified by user, program, device, or may be determined by the start module 204 based on feedback information.

In some embodiments, it may not be known initially that a code path between the starting point and ending point exists. In other embodiments, it may be known that at least one or more code paths exist between the starting point and ending point, and a user may interested to determine all of the potential code paths between the starting point and the ending point. The code path analyzer module 206 is utilized to accomplish this function.

The code path analyzer module 206 determines each code path flowing from the starting point to the ending point. The code path analyzer module 206 preferably does this without execution of the code by analyzing the code listing. For example, the code path analyzer module 206 may search the code listing 106 for statements such as "IF" and "SELECT" statements or for branches and calls as well as cross referenced modules. From the analysis of the code listing the code path analyzer module 206 can follow each possible code path based on potential variable values and determine each potential path from the specified starting point to the specified ending point. During this process, the code path analyzer module 206 is able to identify not only the potential code paths but also the variable values that correspond to each potential code path. This information enables a user or program to ensure code path coverage or to force a particular code path for execution during troubleshooting or other processes.

In some embodiments, the code path analyzer module 206 may utilize the map module 210 to access or create a decision map based on the analysis of the code listing 106. The map module generates a decision map by scanning the listing of code for decision statements. Each decision statement typically includes code from which two or more code paths diverge. From the decision map, the code path analyzer module 206 is able to identify and determine each code path between the starting point and the ending point. In some embodiments, a pre-generated decision map may be available for access by the code path analyzer module 206. In other embodiments, the map module 210 may generate the decision map on-the-fly.

Typically, the decision map is generated by traversing the code listing in an organized fashion. For example, the map module 210 or code path analyzer module 206 may start at the beginning module and work forward in a breadth-first traversal, noting all possible code paths that are consistent with known values. Or conversely, the traversal may begin at the ending point and work backwards. Of course, other types of traversal techniques besides breadth-first are contemplated as will be recognized by those of skill in the art so long as coverage of each potential code path between the starting point and ending point is enabled.

As noted above, the code path analyzer module 206 in some embodiments may receive one or more known variable values. In such an embodiment, the code path analyzer module 206 determines each code path from the starting point to the ending point that is reachable given the one or more known variable values. By utilizing known variables, the number of potential code paths may be reduced thereby enabling a user to more quickly narrow in on a particular code path of interest. In some embodiments, it is possible that numerous code paths diverge from a single module in the code listing depending on particular variable value. For example, a particular variable 'A' might be depend on a numerical value such that one code path results if 'A=1' another results if 'A=2' and another results if 'A=3' etc. In such a situation, it may be useful to limit the determined code paths to those that result if 'A=2'. For example, it might be known that an error in a program only occurs when 'A=2' so a user might be interested in focusing in the code paths that result from that known variable value.

In some embodiments, there are some known and some unknown variables. In such embodiments the code path analyzer module 206 may determine each code path from the starting point to the ending point that is reachable based on potential values of the unknown variable values given the known variable values. Thus one or more known variables may be utilized while still determining each potential code path that may result depending on the unknown variables.

The results module 208 provides information about the determined code paths to a user. Typically, this is done in one of a graphical format, a textual format, or both. For example, the results module 208 may present a graphical representation such as a flow chart depicting a flow of the relevant portions of code, or it may present text describing the code paths such as one module followed by another (See FIGS. 4 and 5). In one embodiment, the results module also identifies potential values for each unknown variable corresponding to a particular code path such that execution of the code based on the identified values would result in execution of the particular corresponding code path. The results module 208 may then present the identified potential variable values to the user. The identified potential variable values may be useful to a user in troubleshooting a software program, such as by forcing execution of a particular code path or limiting analysis to a particular code path.

Figure 3:
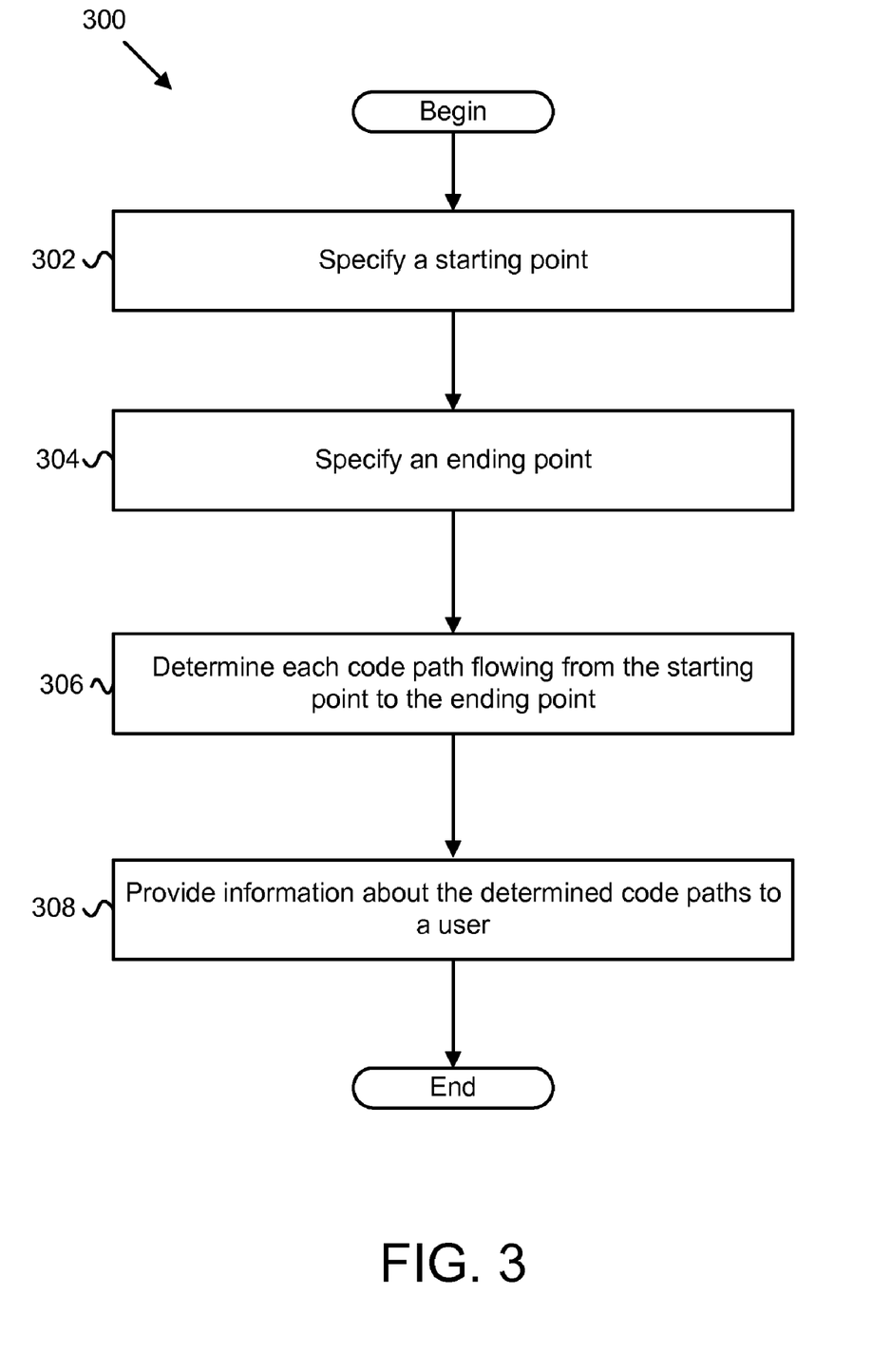
FIG. 3 is a schematic flow chart diagram illustrating one embodiment of a method for analyzing code paths in accordance with the present invention.

FIG. 3 is a schematic flow chart diagram illustrating one embodiment of a method 300 for analyzing code paths in accordance with the present invention. The method 300 substantially includes the modules and embodiments described herein with regard to FIGS. 1, 2, 4, and 5 described herein. In at least one embodiment, the method 300 may be implemented via a computer program product that includes a computer readable storage medium having computer usable program code executable to perform the operations included in the method.

The method 300 begins when a start module 202 specifies 302 a starting point for one or more code paths with a listing of code 106. Preferably, the starting point includes code form which one or more code paths flow. Next, an end module 204 specifies 304 an ending point for one or more code paths within the code that is reachable via one or more of the code paths flowing from the starting point.

A code path analyzer module 206 determines 306 each code path flowing from the starting point to the ending point by analyzing the listing of code 106 without execution of the code. This may be done in some embodiments by utilizing a map module 210 to scan the code listing 106 for divergent code paths and generating a decision map corresponding to the various potential code paths between the starting point and ending point. In some embodiments this may include receiving one or more known variable values and determining each code path from the starting point to the ending point that is reachable given the one or more known variables. In further embodiments, some variable values may be known and some variable values unknown and the code path analyzer module 206 determines each potential code path based the potential values of the unknown variables given the known variables.

Finally, the results module 208 provides 308 information about the determined code paths to a user. The results may be presented in any form known to those of skill in the art including graphical and textual representations of the code paths and potential variable values corresponding to the code paths.

Figure 4:
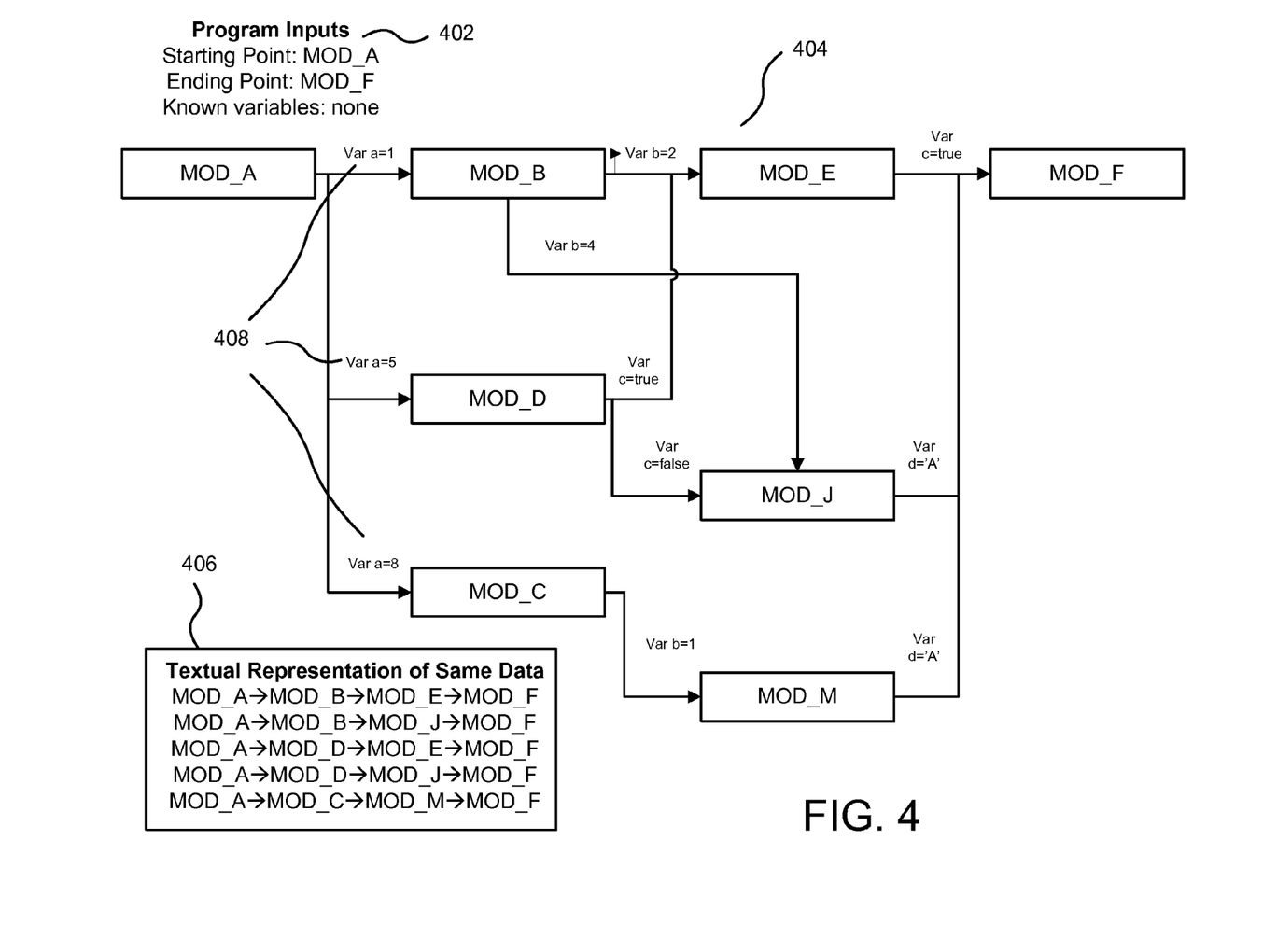
FIG. 4 is a schematic flow chart diagram illustrating one embodiment of output information resulting from the analyzation of code paths in a accordance with the present invention.

FIG. 4 is a schematic flow chart diagram illustrating one embodiment of output information provided by the results module 208 and resulting from the analyzation of code paths in a accordance with the present invention. In the depicted embodiment, the output information includes identification of the program inputs 402 including the starting point (MOD_A), the ending point (MOD_F), and known variables (none). Thus, the depicted output information provides information including each potential path between MOD_A and MOD_F in a code listing 106. For example, one path may include the MOD_A, MOD_B, MOD_E, and MOD_F, and another path might include MOD_A, MOD_D, MOD_J, and MOD_F.

Because there are no known variables, each potential code path is included. Provided in the depicted output information is both a graphical representation 404 of the potential code paths as well as a textual representation 406 of the potential code paths. Of course, in various embodiments, other types of outputs may be utilized including only a graphical representation, only a textual representation, or another representation known to those of skill in the art.

The depicted embodiment also depicts potential variable values 408 that correspond to particular code paths. For example, three potential code paths diverge from the module 'MOD_A' depending on the variable value of 'a'. The potential variable values 408 of 'a' include 'a=1', 'a=5', and 'a=8'. Each of these values will result in a different code path leading one of modules 'MOD_B', 'MOD_C', or 'MOD_D'. Similar potential variable values are provided for each potential branch or code path.

In an alternate embodiment, each code path may be depicted individually instead of in a flow chart manner as shown in FIG. 4. For example, a separate depiction may be provided for each determined code path between the starting point and the ending point. The textual representation 406 indicates each individual code path in a singular manner. For example, one path is identified as 'MOD_A→MOD_B→MOD_E→MOD_F'. A corresponding graphical representation of individual code paths may similarly be provided.

Figure 5:
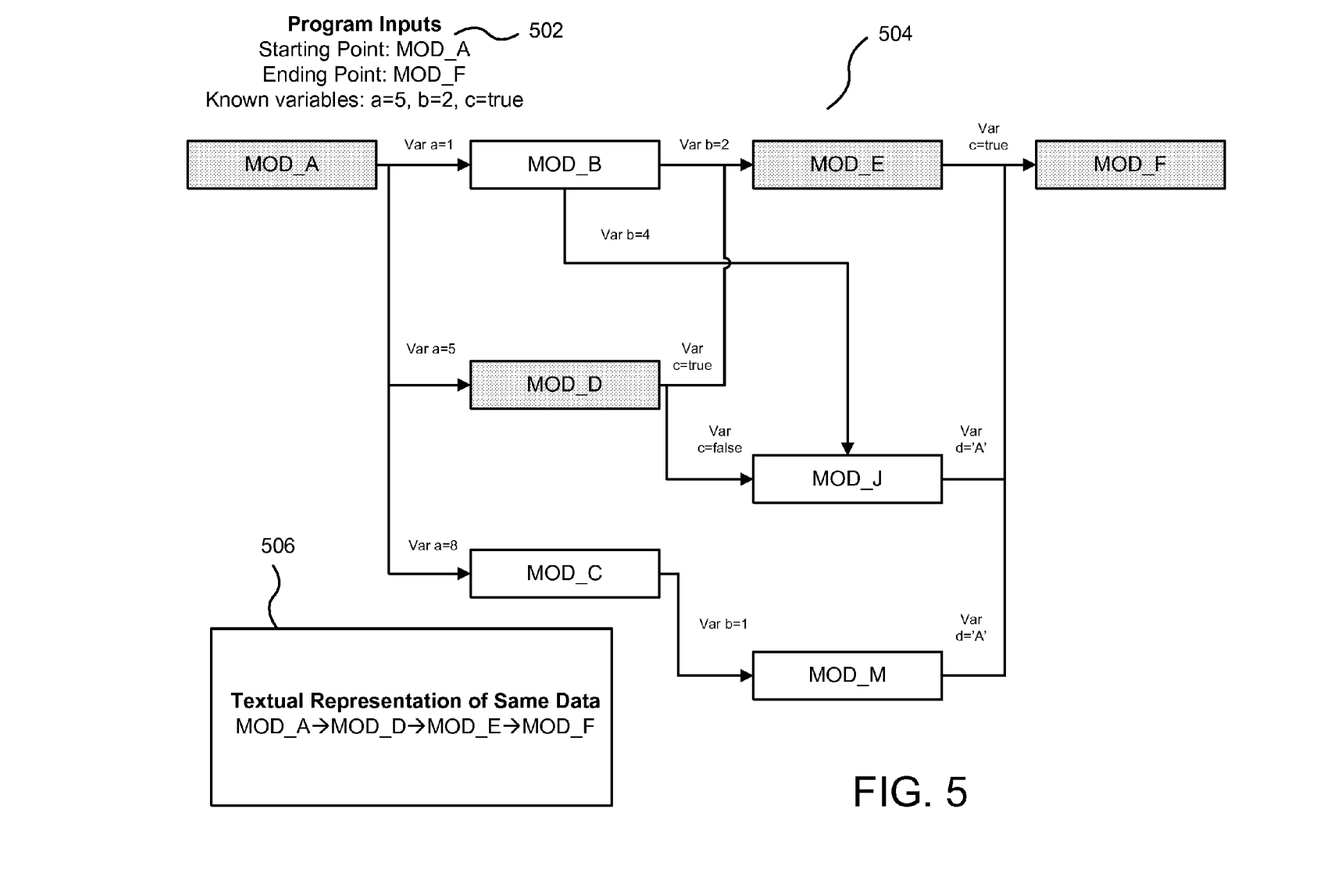
FIG. 5 is a schematic flow chart diagram illustrating another embodiment of output information resulting from the analyzation of code paths in accordance with the present invention.
Figure 6:
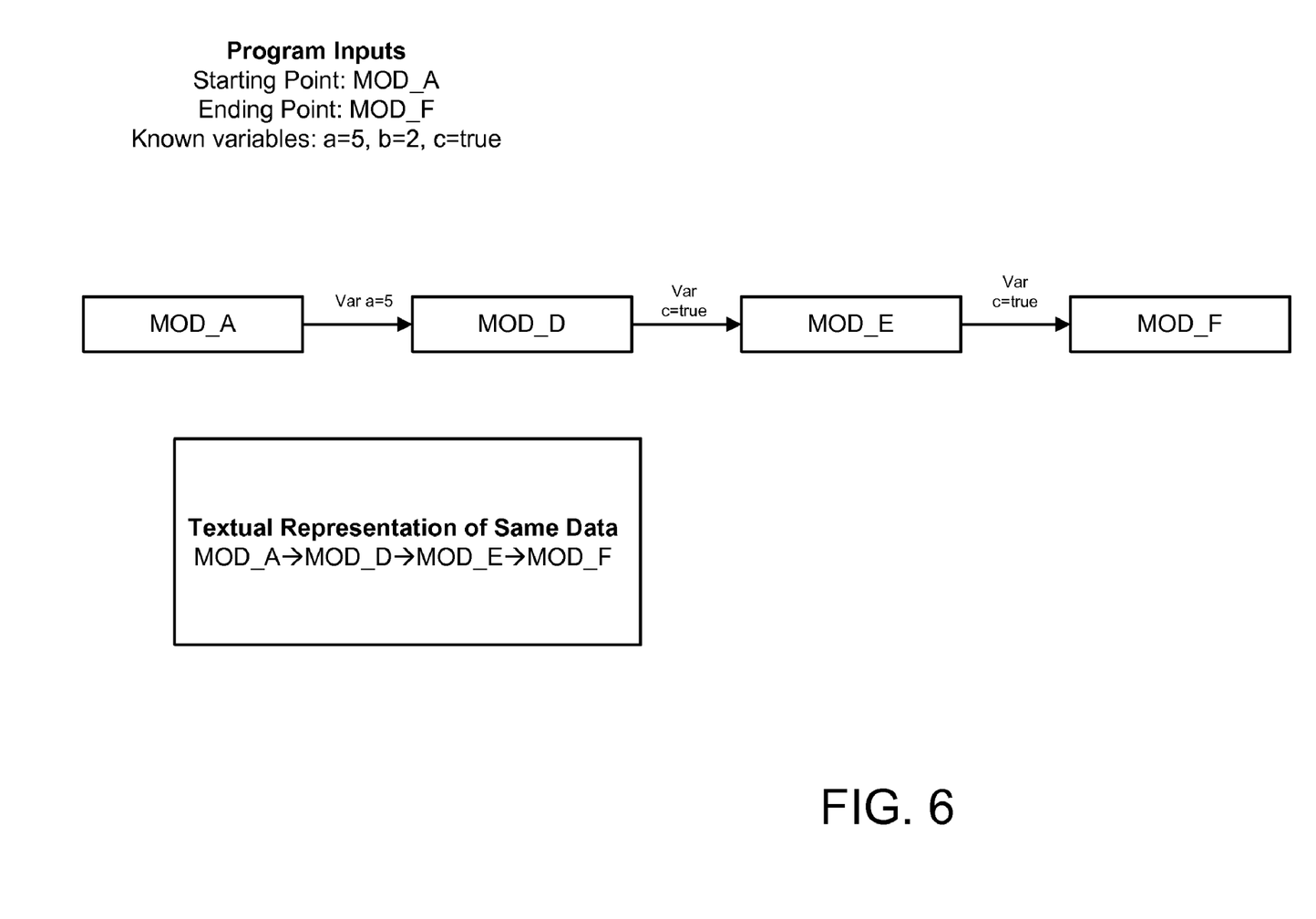
FIG. 6 is a schematic flow chart diagram illustrating another embodiment of output information resulting from the analyzation of code paths in accordance with the present invention.

FIG. 5 is a schematic flow chart diagram illustrating another embodiment of output information resulting from the analyzation of code paths in accordance with the present invention. Like FIG. 4, FIG. 5 also depicts program inputs 502, a graphical representation of the code paths 504, and a textual representation of the data 506. However, in this embodiment, the program inputs 502 includes known variables 'a=5', 'b=2', and 'c=true'. The known variable values limit the potential paths to a single code path identified by the shaded boxes and including the modules MOD_A, MOD_D, MOD_E, and MOD_F. Again, in an alternate embodiment, the graphical representation may be limited to just the code path resulting from the known variables or other formats recognized by those of skill in the art. FIG. 6 is a schematic flow chart diagram illustrating one such example of a graphical representation of a just the code path resulting from the known variables as specified.

A user may use the information provided in output information of FIGS. 4 and 5 to more efficiently analyze code paths, ensure code path coverage, and to force particular code paths for execution. Thus, the present invention provides a more efficient and useful tool for analyzing code listings.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to analyze code paths, the apparatus comprising:
- a start module that accepts, from external input, a starting point for one or more code paths within a listing of code, the starting point comprising a first point in the listing of code from which one or more code paths flow;
- an end module that accepts, from external input, an ending point for one or more code paths within the listing of code, the ending point comprising a second point in the listing of code that is reachable via one or more of the code paths flowing from the starting point;
- a code path analyzer module that determines each code path flowing from the starting point to the ending point, the code path analyzer module determining each code path from the starting point to the ending point by analyzing the listing of code without execution of the code, wherein the code path analyzer module accesses a pre-generated decision map to determine each code path between the starting point and ending point, the pre-generated decision map comprising a representation of decision statements, each decision statement comprising code from which two or more code paths diverge; and
- a results module that provides information about the determined code paths to a user,
- wherein the start module, the end module, the code path analyzer module, and the results module comprise one or more of logic hardware and executable code stored on a computer readable storage medium.

2. The apparatus of claim 1, wherein the code path analyzer module receives one or more known variable values, the code path analyzer module determining each code path from the starting point to the ending point that is reachable given the one or more known variable values.

3. The apparatus of claim 2, wherein one or more variable values are unknown, the code path analyzer module determining each code path from the starting point to the ending point that is reachable based on potential values of the one or more unknown variable values and based on the one or more known variable values.

4. The apparatus of claim 3, wherein the results module identifies potential values for each unknown variable value corresponding to a particular code path such that execution of the code based on the identified values would result in execution of the particular corresponding code path, the results module presenting the identified potential variable values to the user.

5. The apparatus of claim 1, the apparatus further comprising a map module that generates a decision map by scanning the listing of code for decision statements, each decision statement comprising code from which two or more code paths diverge, the code path analyzer module utilizing the decision map to determine each code path between the starting point and ending point.

6. The apparatus of claim 5, wherein the code path analyzer module traverses the decision map beginning the specified starting point in a breadth first traversal until each code path between the starting point and the ending point is determined.

7. The apparatus of claim 5, wherein the code path analyzer module traverses the decision map beginning with the specified ending point and working backwards in a breadth-first traversal until each code path between the starting point and ending point is determined.

8. The apparatus of claim 1, wherein the results module provides a graphical representation of the determined code paths to a user.

9. The apparatus of claim 1, wherein the results module provides a textual representation of the determined code paths to a user.

10. A system to analyze code paths, the system comprising:
- a computer system comprising a processor configured to execute program code;
- a memory having stored there on a listing of code for analyzation;
- a start module that accepts, from external input, a starting point for one or more code paths within the listing of code, the starting point comprising a first point in the listing of code from which one or more code paths flow;
- an end module that accepts, from external input, an ending point for one or more code paths within the listing of code, the ending point comprising a second point in the listing of code that is reachable via one or more of the code paths flowing from the starting point;
- a code path analyzer module that determines each code path flowing from the starting point to the ending point, the code path analyzer module determining each code path from the starting point to the ending point by analyzing the listing of code without execution of the code, wherein the code path analyzer module accesses a pre-generated decision map to determine each code path between the starting point and ending point, the pre-generated decision map comprising a representation of decision statements, each decision statement comprising code from which two or more code paths diverge; and
- a results module configured to provide information about the determined code paths to a user.

11. The system of claim 10, wherein the code path analyzer module receives one or more known variable values, the code path analyzer module determining each path from the starting point to the ending point that is reachable given the one or more known variable values.

12. The system of claim 11, wherein one or more variable values are unknown, the code path analyzer module determining each code path from the starting point to the ending point that is reachable based on potential values of the one or more unknown variable values and based on the one or more known variable values.

13. The system of claim 12, wherein the results module identifies potential values for each unknown variable value corresponding to a particular code path such that execution of the code based on the identified values would result in execution of the particular corresponding code path, the results module presenting the identified potential values to the user.

14. A computer program product comprising a computer readable storage medium having computer usable program code executable to perform operations for analyzing code paths, the operations of the computer program product comprising:
- accepting, from external input, a starting point for one or more code paths within a listing of code, the starting point comprising a first point in the listing of code from which one or more code paths flow;
- accepting, from external input, an ending point for one or more code paths within the listing of code, the ending point comprising a second point in the listing of code that is reachable via one or more of the code paths flowing from the starting point;
- determining each code path flowing from the starting point to the ending point by analyzing the listing of code without execution of the code, wherein determining each code path further comprises accessing a pre-generated decision map between the starting point and ending point, the pre-generated decision map comprising a representation of decision statements, each decision statement comprising code from which two or more code paths diverge; and providing information about the determined code paths to a user.

15. The computer program product of claim 14, further comprising receiving one or more known variable values, wherein determining each code path flowing from the starting point to the ending point comprises determining each code path from the starting point to the ending point that is reachable given the one or more known variable values.

16. The computer program product of claim 15, wherein one or more variable values are unknown, wherein determining each code path flowing from the starting point to the ending point comprises determining each path from the starting point to the ending point based on the one or more unknown variable values and given the one or more known variable values.

17. The computer program product of claim 16, wherein providing information about the determined code paths to a user comprises identifying potential values for each unknown variable value corresponding to a particular code path such that execution of the code based on the identified values would result in execution of the particular corresponding code path and presenting the identified potential values to the user.

18. The computer program product of claim 14, further comprising generating a decision map by scanning the listing of code for decision statements, each decision statement comprising code from which two or more code paths diverge, the decision map utilized to determine each code path between the starting point and ending point.

19. The computer program product of claim 18, further comprising traversing the decision map beginning with the specified starting point and traversing the decision map in a breadth first traversal until each code path between the starting point and the ending point is determined.

* * * * *